US012810704B2

(12) United States Patent
Sparkes

(10) Patent No.: US 12,810,704 B2
(45) Date of Patent: Nov. 24, 2026

(54) PERIMETER BREACH WARNING ALARM

(71) Applicant: James Robert Sparkes, Champion (CA)

(72) Inventor: James Robert Sparkes, Champion (CA)

( * ) Notice: Subject to any disclaimer, the term of this patent is extended or adjusted under 35 U.S.C. 154(b) by 546 days.

(21) Appl. No.: 18/269,205

(22) PCT Filed: Dec. 22, 2021

(86) PCT No.: PCT/CA2021/051878

§ 371 (c)(1), (2) Date: Jun. 22, 2023

(87) PCT Pub. No.: WO2022/133609

PCT Pub. Date: Jun. 30, 2022

(65) Prior Publication Data

US 2024/0135792 A1 Apr. 25, 2024
US 2024/0233501 A9 Jul. 11, 2024

Related U.S. Application Data

(60) Provisional application No. 63/129,068, filed on Dec. 22, 2020.

(51) Int. Cl.
*G08B 13/12* (2006.01)
*F42C 7/12* (2006.01)
(Continued)

(52) U.S. Cl.
CPC ................ *G08B 13/12* (2013.01); *F42C 7/12* (2013.01); *F42C 15/20* (2013.01); *G08B 15/02* (2013.01)

(58) Field of Classification Search
CPC . G08B 13/12; G08B 15/02; F42C 7/12; F42C 15/20; F41H 11/00; F42B 12/36; F42B 27/00; F17D 5/02
(Continued)

(56) References Cited

U.S. PATENT DOCUMENTS 3,071,104 A * 1/1963 Mccandlish .......... A01M 29/20 116/83
3,119,334 A * 1/1964 Beermann ................. F42C 7/12 102/261

(Continued)

FOREIGN PATENT DOCUMENTS

EP 0520176 B1 6/1996
EP 1094293 A1 * 4/2001 .............. F42C 14/02
FR 2296890 A1 9/1977

OTHER PUBLICATIONS

International Search Report and Written Opinion mailed Mar. 29, 2022 (Mar. 29, 2022) in corresponding International Patent Application No. PCT/CA2021/051878.

*Primary Examiner* — Xin Y Zhong
*Assistant Examiner* — Evan Mancini
(74) *Attorney, Agent, or Firm* — Troutman Pepper Locke LLP

(57) ABSTRACT

A perimeter breach warning device includes a main body forming a firing bore therethrough, a holding protrusion at the first firing bore end, a firing pin assembly within and extending out from the firing bore, a primer within the firing bore at the second firing bore end, a safety nozzle, and a trip pin configured to be inserted into the trip pin bore of the shaft such that the spring of the firing pin assembly is compressed, wherein the spring is configured to decompress in response to removal of the trip pin, thereby causing the firing pin assembly to move within the firing bore towards the second firing bore end until the firing pin strikes the primer causing a primer explosion and the external shaft protrusion interfaces with the internal firing bore protrusion causing the firing pin assembly to stop moving towards the second firing bore end.

17 Claims, 5 Drawing Sheets

(51) Int. Cl.
*F42C 15/20* (2006.01)
*G08B 15/02* (2006.01)

(58) Field of Classification Search
USPC .......................................................... 116/83
See application file for complete search history.

(56) References Cited

U.S. PATENT DOCUMENTS

| | | | | | |
|---|---|---|---|---|---|
| 3,830,158 | A * | 8/1974 | Di Phillipo | F02K 9/95 102/277.2 |
| 4,064,825 | A * | 12/1977 | Sly | G08B 15/00 116/83 |
| 4,164,888 | A * | 8/1979 | Looger | F41A 19/08 89/1.814 |
| 4,727,669 | A * | 3/1988 | Kunneke | F41A 21/28 42/106 |
| 9,574,857 | B1 | 2/2017 | Kravel | |
| 10,895,442 | B1 * | 1/2021 | Quail | F42B 8/26 |
| 2005/0284649 | A1 * | 12/2005 | Sabates | B25D 9/10 173/212 |
| 2011/0198383 | A1 * | 8/2011 | Masas | B25C 1/10 227/156 |
| 2014/0022076 | A1 * | 1/2014 | Bushee | G08B 13/12 340/541 |
| 2016/0074685 | A1 * | 3/2016 | Tagliareni | A62C 13/006 169/46 |
| 2019/0249970 | A1 * | 8/2019 | Wilson | F42C 15/34 |

* cited by examiner

PERIMETER BREACH WARNING ALARM

CROSS REFERENCE TO RELATED APPLICATIONS

This application is a national phase filing under 35 U.S.C. § 371 of International Patent Application No. PCT/CA2021/051878, filed Dec. 22, 2021, which claims the benefit of priority of U.S. Provisional Patent Application No. 63/129,068, filed on Dec. 22, 2020, entitled PERIMETER BREACH WARNING ALARM, the entire contents of each of which are hereby incorporated by reference herein.

FIELD

This disclosure relates to intrusion detection systems, more specifically to a portable explosive alarm that warns of incursions across a predetermined perimeter or boundary configuration.

BACKGROUND

Feeling secure from the intrusion of unwanted four- or two-legged intruders in civilian settings, such as home and farm gardens/yards/fields, on camping or hunting trips, or in military settings such as an excursion into enemy or hostile territory, is essential in some circumstances. The early warning of the arrival of an uninvited visitor into a space enables persons to be on guard and ready to take whatever appropriate action is necessary to protect their person or property, and/or may also scare the intruder away.

There is a need in the art for a safe, compact, portable, durable and simple-to-use perimeter breach warning system, that operates without electrical power (e.g., electrical outlet, battery, solar) or complex components such as sensors and microcontrollers.

SUMMARY

Embodiments of the present disclosure address and overcome one or more of the above shortcomings and drawbacks by providing devices, systems, and methods related to a perimeter breach warning alarm.

In one general aspect, the present disclosure is directed to a perimeter breach warning device. In an embodiment, the perimeter breach warning device comprises a main body, a holding protrusion, a firing pin assembly, a primer, a safety nozzle, and a trip pin. The main body forms a firing bore therethrough, wherein the firing bore comprises a first firing bore end, a second firing bore end, and an internal firing bore protrusion. The holding protrusion is at the first firing bore end. The firing pin assembly is within and extending out from the firing bore. The firing pin assembly comprises a shaft comprising a first shaft end and a second shaft end. The shaft comprises a firing pin at the second shaft end, an external shaft protrusion, a trip pin bore perpendicular to its length, and a spring about the shaft between the external shaft protrusion and the holding protrusion. The primer is within the firing bore at the second firing bore end. The safety nozzle is removably attached to the second firing bore end. The safety nozzle comprises a first safety nozzle end, a second safety nozzle end, an internal safety nozzle volume, and external safety nozzle walls. The first safety nozzle end is open and removably connected to the second firing bore end, the second safety nozzle end is closed, and the external safety nozzle walls form a plurality of apertures. The trip pin is configured to be inserted into the trip pin bore of the shaft such that the spring of the firing pin assembly is compressed. In this configuration, the spring is configured to decompress in response to removal of the trip pin, thereby causing the firing pin assembly to move within the firing bore towards the second firing bore end until the firing pin strikes the primer causing a primer explosion and the external shaft protrusion interfaces with the internal firing bore protrusion causing the firing pin assembly to stop moving towards the second firing bore end.

Various enhancements, refinements, and other modifications can be made to the aforementioned method in different embodiments. For example, in some embodiments, the holding protrusion comprises a set screw slidably attached to and about the shaft of the firing pin assembly, wherein the set screw is removably attached to the first firing bore end by a threaded connection. In some embodiments, the safety nozzle has an internal surface angled to form a frustoconical shape such that force from the primer explosion is directed into the safety nozzle and away from the main body. In some embodiments, the perimeter warning device further comprises a vent adapter comprising a first vent adapter end, a second vent adapter end, and an internal vent adapter surface, wherein the first vent adapter end is removably attached to the main body at the second firing bore end by a threaded connection and the second vent adapter end is attached to the first safety nozzle end, the primer is within the vent adapter at the first vent adapter end, and the internal vent adapter surface is angled to form a frustoconical shape such that force from the primer explosion is directed into the safety nozzle and away from the main body. Further, in some embodiments, the vent adapter comprises stainless steel.

In some embodiments, the main body forms a plurality of mounting bores perpendicular to the firing bore, wherein each of the plurality of mounting bores is configured to receive a fastener to fasten the main body to a solid support. In some embodiments, the main body comprises aluminum and the firing pin assembly comprises stainless steel. In some embodiments, the trip pin further comprises a locking protrusion and the main body forms a locking bore configured to receive the locking protrusion of the trip pin when the trip pin is inserted in the shaft such that when the locking protrusion of the trip pin is in the trip pin bore, the trip pin cannot be removed from the firing pin assembly.

In some embodiments, the main body comprises a first main body end and a second main body end that correspond with the first firing bore end and the second firing bore end, the main body forms a plurality of storage bores parallel to the firing bore comprising storage bore openings at the second main body end, wherein each of the plurality of storage bores is configured to receive a fastener, and the safety nozzle is configured to partially block the storage bore openings when attached to the main body. Further, in some embodiments, each of the plurality of storage bores form a counterbore configured to accommodate within the main body a head of a fastener comprising a head larger in diameter than a main shaft of the fastener.

In some embodiments, the main body comprises a first main body end and a second main body end that correspond with the first firing bore end and the second firing bore end, the trip pin further comprises a locking protrusion, and the main body forms a locking bore configured to receive the locking protrusion of the trip pin when the trip pin is inserted in the shaft such that when the locking protrusion of the trip pin is in the trip pin bore, the trip pin cannot be removed from the firing pin assembly. In addition, the main body forms a plurality of storage bores parallel to the firing bore comprising storage bore openings at the second main body end, wherein each of the plurality of storage bores is configured to receive a fastener. Further, one of the plurality of storage bores and one of the plurality of locking bores connect to form one continuous bore from the first main body end to the second main body end, and the safety nozzle is configured to partially block the storage bore openings when attached to the main body. In yet other embodiments, each of the plurality of storage bores form a counterbore configured to accommodate within the main body a head of a fastener comprising a head larger in diameter than a main shaft of the fastener.

In some embodiments, the shaft of the firing pin assembly forms a plurality of trip pin bores perpendicular to its length, wherein each of the plurality of trip pin bores is configured to receive the trip pin. In some embodiments, the firing pin assembly further comprises a key ring attached to the first shaft end. In some embodiments, the device comprises a spring loaded push-pin to hold the firing pin assembly in place when pulled out of the firing bore to facilitate insertion of the trip pin into the trip pin bore of the shaft of the firing pin assembly. In yet other embodiments, the trip pin has a first trip pin end and a second trip pin end, wherein the second trip pin end forms the shape of a circle.

In another general aspect, the present disclosure is directed to a perimeter breach warning system comprising a first solid support structure, a perimeter breach warning device as described herein, a second support structure, and a flexible line connected to the second support structure and the trip pin of the perimeter breach warning device. In such an embodiment, pulling of the flexible line will remove the trip pin and cause the spring to decompress, causing the firing pin assembly to move within the firing bore towards the second end of the firing bore until the firing pin strikes the primer causing a primer explosion and the external protrusion of the shaft interfaces with the internal protrusion of the firing bore causing the firing pin assembly to stop moving towards the second end of the firing bore.

Various enhancements, refinements, and other modifications can be made to the aforementioned method in different embodiments. For example, in some embodiments, the perimeter breach warning device is attached to the first solid support structure using mechanical fasteners. In other embodiments, the perimeter breach warning device is attached to the first solid support structure using magnets.

In another general aspect, the present disclosure is directed to a method of warning of perimeter breach, the method comprising attaching a perimeter breach warning device as described herein to a first solid support structure and connecting the perimeter breach warning device to a second solid support structure with a flexible line. In such a configuration, upon a perimeter breach, the flexible line will be pulled and will remove the trip pin and cause the spring to decompress, causing the firing pin assembly to move within the firing bore towards the second end of the firing bore until the firing pin strikes the primer causing a primer explosion and the external protrusion of the shaft interfaces with the internal protrusion of the firing bore causing the firing pin assembly to stop moving towards the second end of the firing bore.

BRIEF DESCRIPTION OF THE DRAWINGS

The accompanying drawings, which are incorporated in and form a part of the specification, illustrate embodiments of the disclosed subject matter and, together with the written description, serve to explain the principles, characteristics, and features of the disclosed subject matter.

DETAILED DESCRIPTION

This disclosure is not limited to the particular systems, devices, and methods described, as these may vary. The terminology used in the description is for the purpose of describing the particular versions or embodiments only and is not intended to limit the scope.

As used in this document, the singular forms “a,” “an,” and “the” include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term “comprising” means “including, but not limited to.”

The present disclosure describes devices, systems, and methods related to a perimeter breach warning alarm.

Figure 1B:
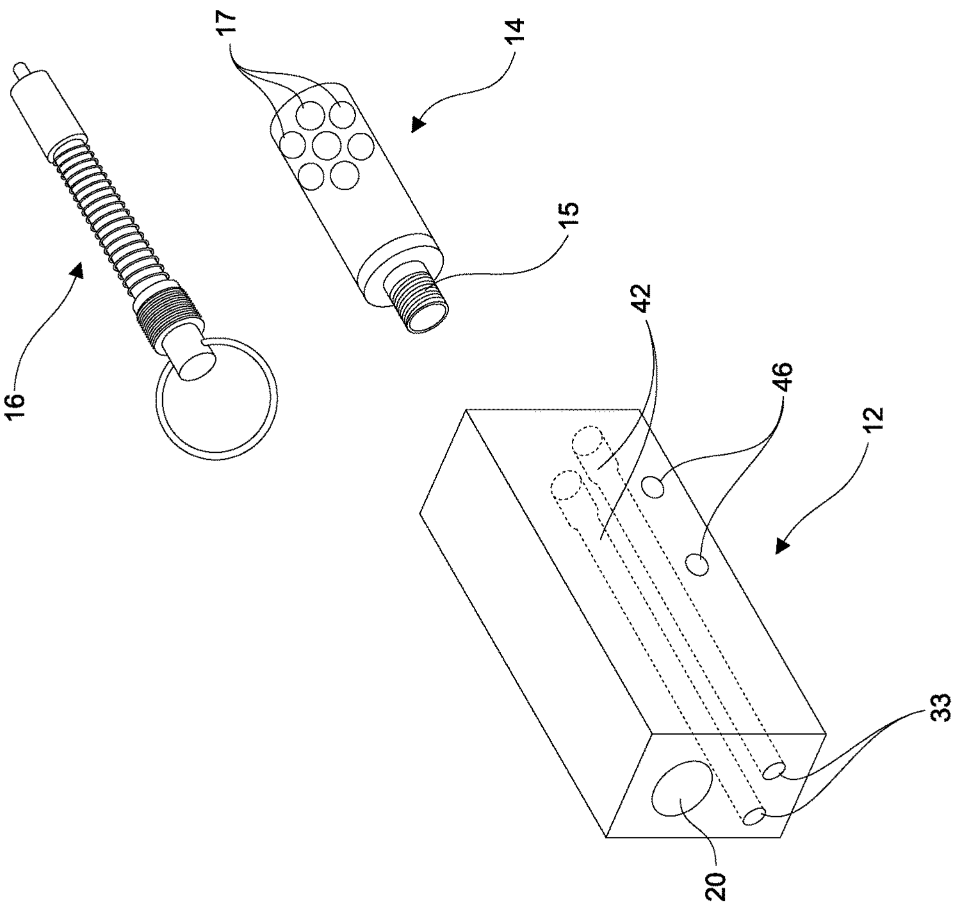
FIG. 1B shows a perimeter breach warning device according to an embodiment taught herein in an exploded view.
Figure 1A:
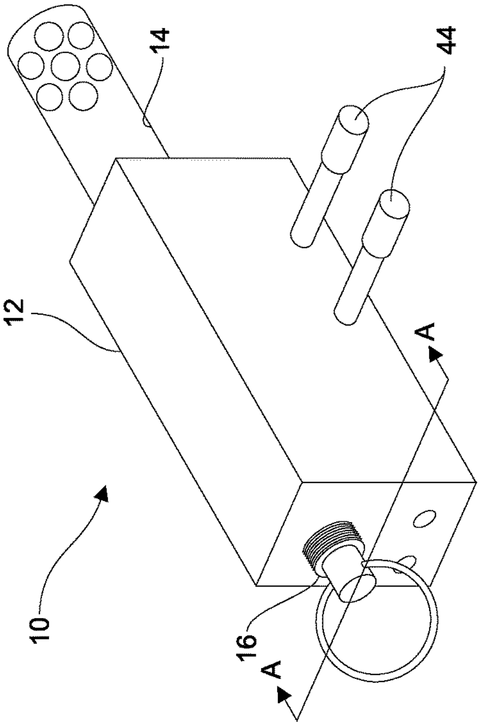
FIG. 1A shows a perimeter breach warning device according to an embodiment taught herein in an assembled view.

FIG. 1A shows a perimeter breach warning device (10) according to an embodiment taught herein in an assembled view. FIG. 1B shows a perimeter breach warning device 10 according to an embodiments taught herein in an exploded view. A perimeter breach warning device 10 is shown to comprise a main body 12, a safety nozzle 14 and a firing pin assembly 16. The device 10 is portable (lightweight and compact), easy to assemble and use, and includes safety features to protect against personal injury. Embodiments include onboard mounting means, for securing the device to a solid support or to the ground.

Figure 3A:
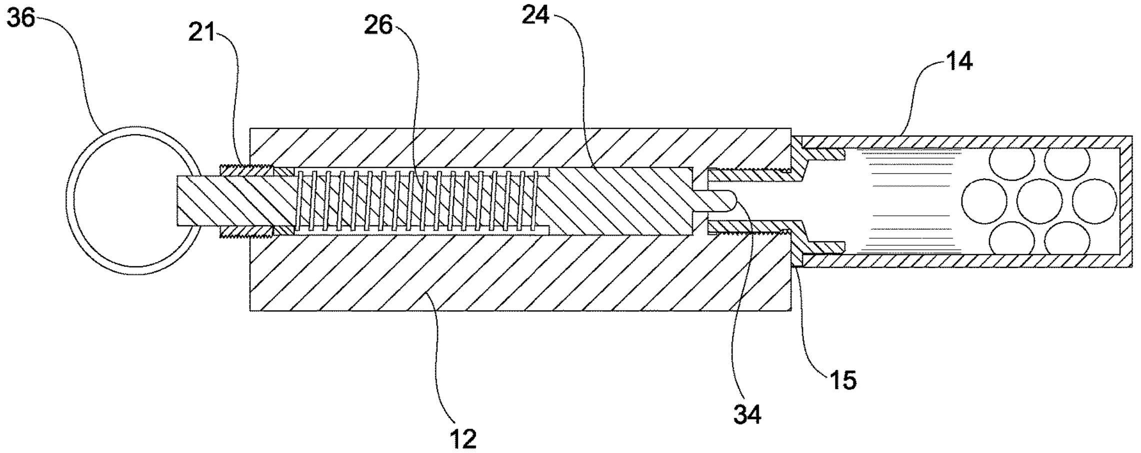
FIG. 3A shows a cross-section of the embodiment shown in FIG. 1A, taken along line A-A of FIG. 1A in an expanded configuration of the spring.
Figure 3B:
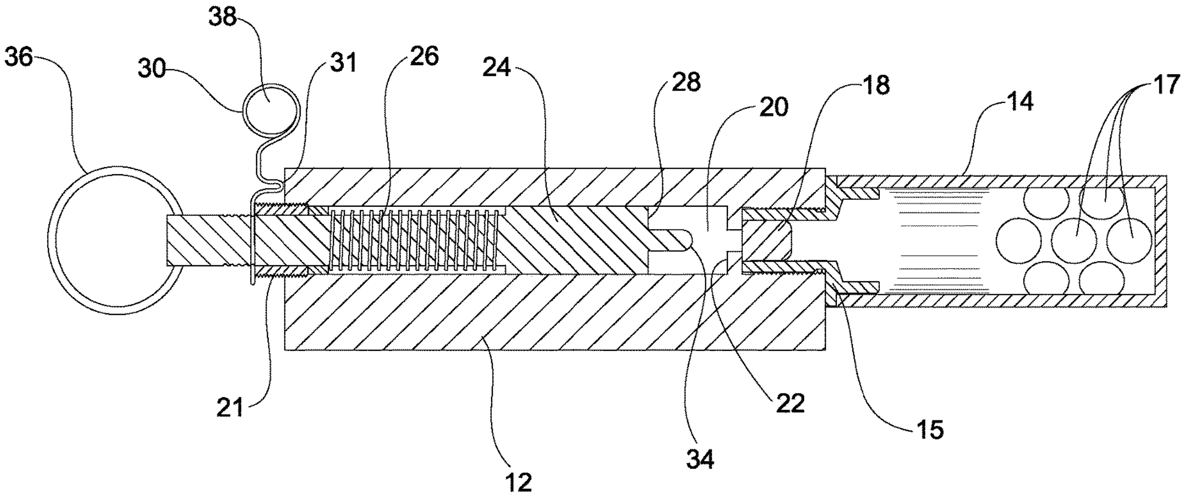
FIG. 3B shows a cross-section of the embodiment shown in FIG. 1A, taken along line A-A of FIG. 1A in a compressed configuration of the spring.

Main body 12 is configured to hold a firing pin assembly 16, such that the pin, when actuated, will strike and detonate a primer 18 that is inserted into the device 10. FIGS. 3A and B are cross sections of the main body 12 of an embodiment of the device, showing a firing bore 20 that accommodates the firing pin assembly 16. FIG. 3A shows the firing pin assembly 16 in an expanded (unarmed) configuration and FIG. 3B shows the firing pin assembly 16 in a compressed (armed) configuration.

In the armed configuration, the spring 26 is compressed and held in a compressed state by trip pin 30. Removal of trip pin 30 enables expansion of the spring 26 and axial movement of the shaft 24 and firing pin 34. In embodiments of the device, firing bore 20 in the main body 12 has an internal bore protrusion 22 at one end that operates as a stop, and the firing pin assembly 16 has an external shaft protrusion 28 at one end that operates as a shoulder. When external shaft protrusion 28 (the shoulder) encounters internal bore protrusion 22 (the stop), axial movement of the firing pin assembly 16 along the firing bore 20 is halted.

In the embodiments shown herein, safety nozzle 14 holds the primer 18 in place for detonation and protects end users from harm as a consequence of the detonation. Safety nozzle 14 comprises an opening at one end into which a vent adapter 15 is inserted.

Vent adapter 15, in turn, holds the primer 18, directs the force of the explosion into the safety nozzle 14, and secures the main body 12 to the safety nozzle 14. In embodiments, one end of the vent adapter 15 is threaded into the opening of the safety nozzle 14 and secured to the safety nozzle 14, for example by gluing, and the other end of the vent adapter 15 is threaded into an opening at the end of firing bore 20. In embodiments the inside surface of the adapter 15 is angled and forms a frustoconical shape in order to direct the force of the primer explosion into the safety nozzle 14 and away from the main body 12.

Safety nozzle 14 comprises external safety nozzle walls that form a plurality of apertures 17 that allow sound and gases to dissipate when the primer 18 explodes in response to ignition by the firing pin 34. The safety nozzle 14 protects nearby persons, animals, and property by controlling the burst of combustion gases and metal fragments that follow explosion of the primer 18. Apertures 17 can be slots, vents, holes, or the like.

Figure 2B:
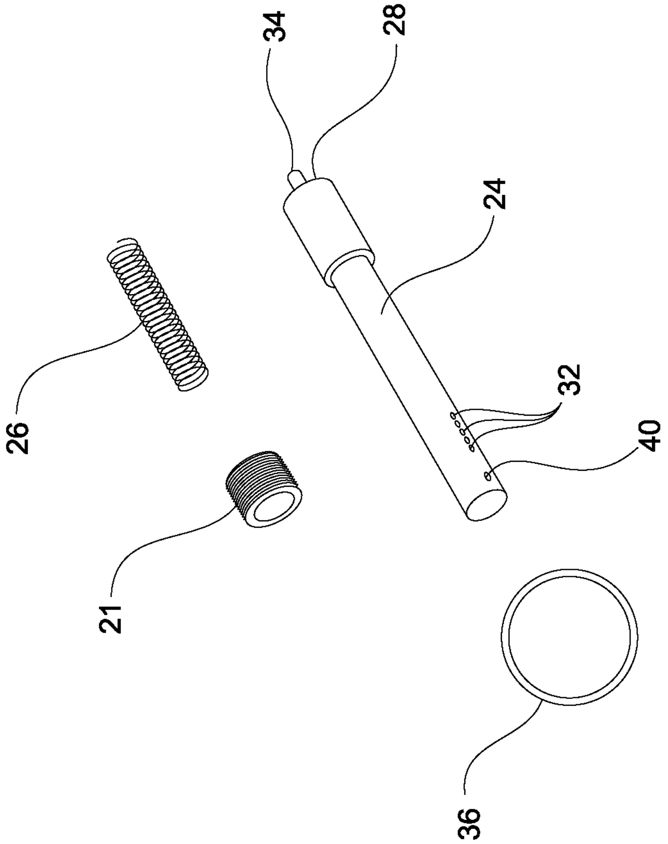
FIG. 2B shows a firing pin assembly according to an embodiment taught herein in an exploded view.
Figure 2A:
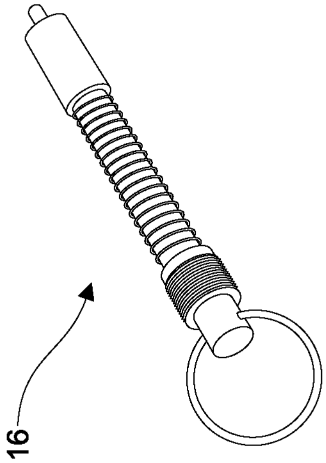
FIG. 2A shows a firing pin assembly according to an embodiment taught herein in an assembled view.

FIG. 2A shows a firing pin assembly 16 according to an embodiment taught herein in an assembled view. FIG. 2B shows a firing pin assembly 16 according to an embodiment taught herein in an exploded view. In this embodiment, the firing pin assembly 16 comprises a shaft 24 about which is disposed a spring 26, an external shaft protrusion 28, a firing pin 34 at one end of the shaft 24, a holding protrusion 21, and a key ring 36 inserted into an eye 40 on the shaft 24. At one end of the shaft 24, the shaft forms trip pin bores 32 sized to accept a trip pin 30. In some embodiments, the holding protrusion 21 is a set screw.

Set screw 21 is used to secure the firing pin assembly 16 inside the firing bore 20 of the main body 12, by threading the firing pin assembly 16 into complementary threads at one end of the firing bore 20. Shaft 24 slides within the set screw 21. After the firing pin assembly 16 is secured in the main body 12 with the set screw 21, pulling axially on the key ring 36 will partially pull the firing pin shaft 24 out of firing bore 20, compressing the spring 26 inside the main body 12 and exposing the trip pin bores 32 of the shaft 24. Trip pin 30 can then be inserted into one of the trip pin bores 32, which will then hold the firing pin assembly 16 in an armed configuration, with spring 26 compressed and firing pin 34 moved a distance from the primer 18 (see FIG. 3B).

The embodiments shown in the Figures herein show a number of trip pin bores 32, any one of which may be selected for use. Alternative embodiments have only one trip pin bore 32.

FIG. 3B shows a cross-section of the embodiment shown in FIG. 1A, taken along line A-A of FIG. 1A, in a compressed configuration of the spring 26. In the compressed (armed or activated) configuration, when trip pin 30 is removed from trip pin bore 32, spring 26 will expand releasing stored potential energy and moving the firing pin 34 towards the primer 18 with sufficient force to ignite or detonate the primer 18 when it is struck with the firing pin 34. The firing pin 34 will move axially in firing bore 20 until the external shaft protrusion 28 encounters the internal firing bore protrusion 22. When external shaft protrusion 28 encounters internal firing bore protrusion 22, firing pin 34 is accurately situated or positioned to detonate the primer 18. The firing pin assembly 16 then returns to the expanded (unarmed or inactivated) configuration, an embodiments of which is illustrated in FIG. 3A.

Trip pin 30 is slidably and freely received in trip pin bore 32, and may be provided with an eye 38 that receives a flexible line, such as a wire, cord, rope, string, cable, or the like. When the line is secured in the eye, if the line is struck or disturbed by an intruder, trip pin 30 slides free of the trip pin bore 32, freeing the shaft 24 for axial movement, such that the firing pin 34 can detonate or ignite the primer causing it to explode with a loud noise.

In an embodiment, trip pin 30 further has a locking protrusion 31 that may be inserted into a locking bore 33 in the main body, to hold the trip pin 30 in place when transporting the device 10 or for loading the device 10 with a primer. In the embodiments shown herein, the locking bore 33 is formed by the end of the storage bore 42, which may hold fasteners 44.

Primer 18 may be a centerfire or rimfire primer, as are known in the art. In preferred embodiments shown in the Figures herein, primer 18 is a centerfire primer, for example a shotgun primer, comprising a small quick burning charge encased in a metal shell. After being struck with sufficient force from firing pin 34, the primer 18 reacts chemically to produce heat, which is transferred to the charge to ignite it, causing an explosion with an associated loud noise.

In the embodiments shown herein, and having reference to FIG. 3B, primer 18 is inserted into the firing bore 20 of the warning device 10, in this case the firing bore 20 of main body 12. More particularly, in these embodiments the primer 18 is inserted into vent adapter 15 at the end of safety nozzle 14 with the anvil facing out. Then safety nozzle 14 is threaded into the main body 12, such that the primer is positioned at the end of firing bore 20.

Vent adapter 15 may be made of any suitable material, however in some embodiments it is made of stainless steel. Main body 12 and safety nozzle 14 may be made of any suitable material, however in some embodiments they are made of aluminum to keep the device lightweight and therefore easily transportable. Firing pin assembly 16 may be made of any suitable material, however in some embodiments is made with stainless steel. Fasteners 44 may be made of any suitable material, however in some embodiments are made with stainless steel.

In the embodiments shown herein, main body 12 additionally comprises storage bores 42 for holding fasteners 44, such as nails or screws, which may be used to mount the warning device 10 to a solid support such as a tree, fencepost, building, gate, and the like. Storage bores 42 may have a counterbore that accommodates the head of the fasteners, so that the fastener ends are flush with, or beneath, the surface of the main body 12 when they are in the storage bores 42. Fasteners 44 may correspondingly have a head that is larger in diameter than the main shaft of the fastener.

Fasteners 44 may be removed from main body 12 and inserted through mounting bores 46 to secure the device 10 to a solid support. Other embodiments contemplate a stake, spike, pole or knife attached, for example, at the end of the safety nozzle 14, for insertion into the ground, to secure the device in place. Yet other embodiments contemplate the use of magnets to secure the device to a solid metal support.

In an embodiment, safety nozzle 14 holds the fasteners 44 in the storage bores 42, when the device 10 is not being used, or when it is being transported. To this end, in an embodiment, the safety nozzle 14, may slightly overlap the openings of the storage bores 42. In another embodiment, the vent adapter 15 may slightly overlap the openings of the storage bores 24. Thus, after the fasteners 44 are inserted into the storage bores 42 and the safety nozzle 14 is threaded into the main body 12, the fasteners 44 are secured within the main body 12.

The embodiments of the device disclosed herein may be used as follows. After the firing pin assembly 16 is secured in the firing bore 20 of the main body 12, the user pulls on key ring 36 to pull the firing pin shaft 24 partially out of the main body 12 against the force of the spring 26, exposing one or more trip pin bores 32. Trip pin 30 is inserted into a trip pin bore 32, after which the tension on the key ring 36 can be released. In other embodiments a spring-loaded push pin is used to hold the firing pin shaft 24 in place when pulled out of firing bore 20, which facilitates insertion of the trip pin 30 into an trip pin bore 32. The firing pin assembly 16 is now activated. At this point, locking protrusion 31 on the trip pin 30 may be inserted into locking bore 33 in the main body 12, to hold the trip pin 30 in place so that the trip pin 30 does not accidentally get pulled out of trip pin bore 32.

The device 10 can then be loaded with the primer 18. To load the device 10 with the primer 18, the user can unscrew the safety nozzle 14 from the main body 12, which releases the fasteners 44 from their storage bores 46. The primer 18 can then be inserted into the vent adapter 15 at the end of the safety nozzle 14. The user can then rethread the safety nozzle 14 into the main body 12 to secure the primer 18 in place within the main body 12.

The device 10 may then be secured to a solid support, such as a post, tree, building, or the like. This is done by inserting fasteners 44 through mounting bores 46, and then nailing or screwing the fasteners 44 into the solid support.

A line is then secured to another solid support such as another post, tree, building, or the like, and extended to eye 38 of the trip pin 30 and secured thereto. The locking protrusion 31 on the trip pin 30 may then be moved out of the locking bore 33 in the main body 12, by rotating the trip pin 30. The device 10 is now activated. When the line is struck or disturbed by an intruder, trip pin 30 slides free of the trip pin bore 32 and shaft 24 moves axially with such force that the firing pin 34 will detonate or ignite the primer 18 causing it to explode with a loud noise.

Figure 4:
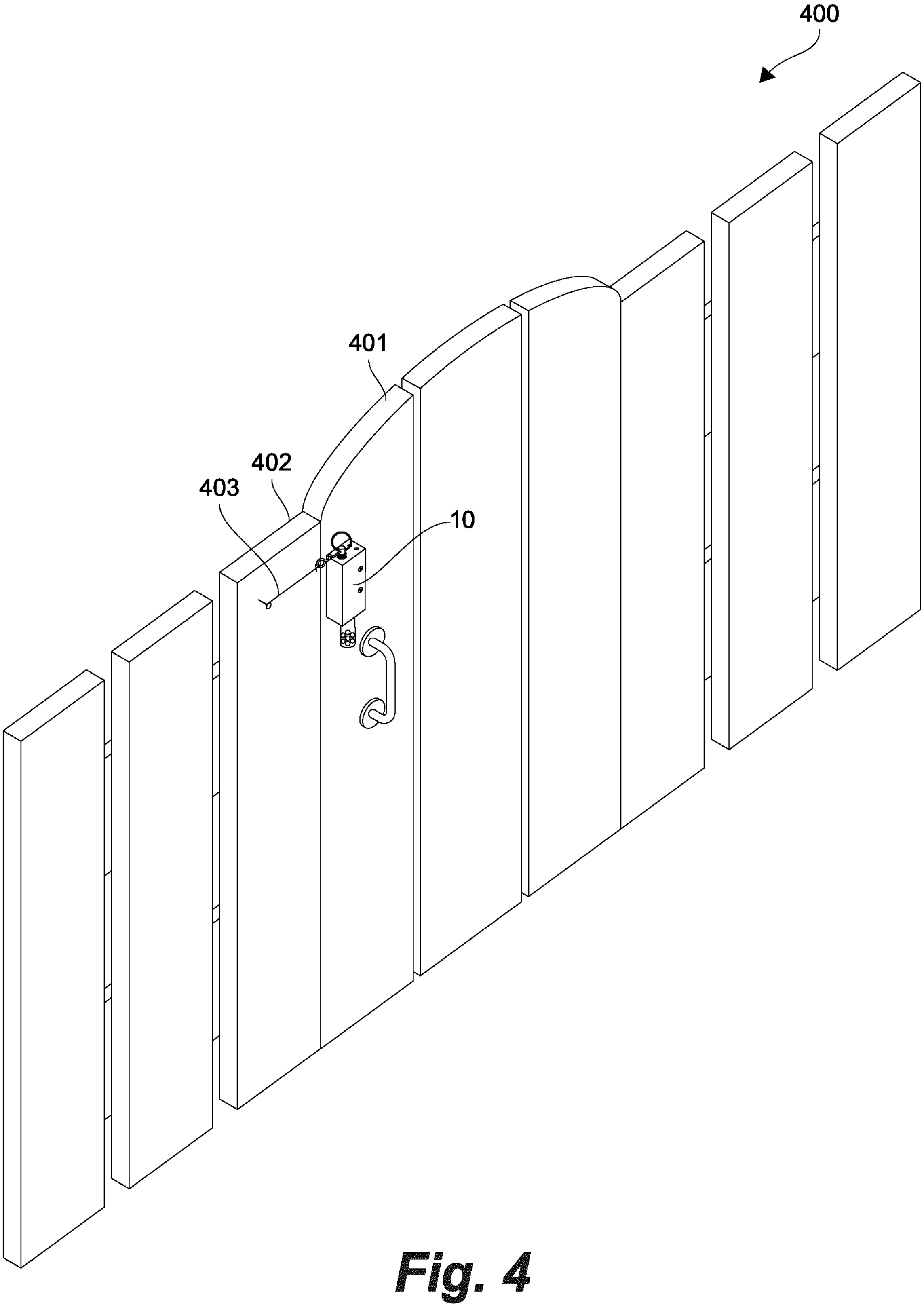
FIG. 4 shows a perimeter breach warning system.

FIG. 4 shows a perimeter breach warning system 400. In an embodiment, the perimeter breach warning system 400 comprises a first solid support structure 401, a perimeter breach warning device 10, a second support structure 402, and a flexible line 403. The flexible line 403 may connect the second support structure 402 and the trip pin 30 of the perimeter breach warning device 10. In this configuration, pulling of the flexible line 403 will remove the trip pin 30, which will cause the spring to decompress, which will cause the firing pin assembly 16 to move within the firing bore 20 towards the second end of the firing bore 20 until the firing pin 34 strikes the primer 18, causing a primer explosion. The firing pin assembly 16 will be stopped when the external protrusion of the shaft 22 interfaces with the internal protrusion of the firing bore 28. In the embodiment of FIG. 4, the first solid support structure 401 is a fence door, and the flexible line 403 will be pulled when the fence door is opened, actuating the device 10. In some embodiments, the perimeter breach warning device 10 is attached to a first solid support structure 401 using mechanical fasteners. In some embodiments, the perimeter breach warning device 10 is attached to a first solid support structure 401 using magnet, for example, if the first solid support structure is metal.

Figure 5:
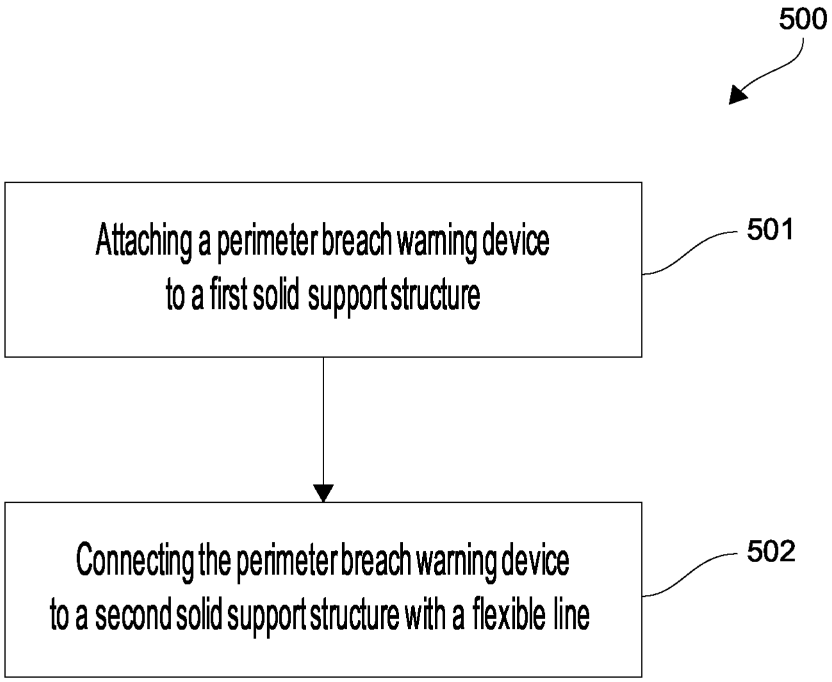
FIG. 5 shows a method of warning of perimeter breach.

FIG. 5 shows a method of warning of perimeter breach. In some embodiments, the method of warning of perimeter breach comprises attaching a perimeter breach warning device 10 to a first solid support structure and connecting the perimeter breach warning device at 501 and connecting the perimeter breach warning device 10 to a second solid support structure using a flexible line at 502. In this configuration, upon a perimeter breach, the flexible line will be pulled, which will remove of the trip pin 30, which will cause the spring 26 to decompress, which will cause the firing pin assembly 16 to move within the firing bore 30 towards the second end of the firing bore 20 until the firing pin 34 strikes the primer 18 causing a primer explosion. The firing pin assembly 16 will stop when the external protrusion of the shaft 22 interfaces with the internal protrusion of the firing bore 28.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to the specific instrumentalities disclosed, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various methods, systems, and articles of manufacture are described in terms of "comprising" various components or steps (interpreted as meaning "including, but not limited to"), the methods, systems, and articles of manufacture can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

I claim:

1. A perimeter breach warning device comprising:

a main body forming a firing bore therethrough, wherein the firing bore comprises a first firing bore end, a second firing bore end, and an internal firing bore protrusion, wherein the main body comprises a first main body end and a second main body end that correspond with the first firing bore end and the second firing bore end, wherein the main body forms a plurality of storage bores parallel to the firing bore comprising storage bore openings at the second main body end, wherein each of the plurality of storage bores is configured to receive a fastener;

a holding protrusion at the first firing bore end;

a firing pin assembly within and extending out from the firing bore, the firing pin assembly comprising:

a shaft comprising a first shaft end and a second shaft end, wherein the shaft comprises:

a firing pin at the second shaft end, and an external shaft protrusion, wherein, at the first shaft end, the shaft forms a trip pin bore perpendicular to its length, a spring about the shaft between the external shaft protrusion and the holding protrusion, a primer within the firing bore at the second firing bore end;

a safety nozzle removably attached to the second firing bore end and configured to partially block the storage bore openings when attached to the main body, the safety nozzle comprising a first safety nozzle end, a second safety nozzle end, an internal safety nozzle volume, and external safety nozzle walls, wherein:

the first safety nozzle end is open and removably connected to the second firing bore end, the second safety nozzle end is closed, and the external safety nozzle walls form a plurality of apertures; and a trip pin configured to be inserted into the trip pin bore of the shaft such that the spring of the firing pin assembly is compressed, wherein the spring is configured to decompress in response to removal of the trip pin, thereby causing the firing pin assembly to move within the firing bore towards the second firing bore end until the firing pin strikes the primer causing a primer explosion and the external shaft protrusion interfaces with the internal firing bore protrusion causing the firing pin assembly to stop moving towards the second firing bore end.

2. The perimeter breach warning device of claim 1, wherein the holding protrusion comprises a set screw slidably attached to and about the shaft of the firing pin assembly, wherein the set screw is removably attached to the first firing bore end by a threaded connection.

3. The perimeter breach warning device of claim 1, wherein the safety nozzle has an internal surface angled to form a frustoconical shape such that force from the primer explosion is directed into the safety nozzle and away from the main body.

4. The perimeter breach warning device of claim 1, further comprising:

a vent adapter comprising a first vent adapter end, a second vent adapter end, and an internal vent adapter surface, wherein the first vent adapter end is removably attached to the main body at the second firing bore end by a threaded connection and the second vent adapter end is attached to the first safety nozzle end, wherein the primer is within the vent adapter at the first vent adapter end, wherein the internal vent adapter surface is angled to form a frustoconical shape such that force from the primer explosion is directed into the safety nozzle and away from the main body.

5. The perimeter breach warning device of claim 4, wherein the vent adapter comprises stainless steel.

6. The perimeter breach warning device of claim 1, wherein the main body forms a plurality of mounting bores perpendicular to the firing bore, wherein each of the plurality of mounting bores is configured to receive the fastener to fasten the main body to a solid support.

7. The perimeter breach warning device of claim 1, wherein the main body comprises aluminum and the firing pin assembly comprises stainless steel.

8. The perimeter breach warning device of claim 1, wherein the trip pin further comprises a locking protrusion, wherein the main body forms a locking bore configured to receive the locking protrusion of the trip pin when the trip pin is inserted in the shaft, and wherein when the locking protrusion of the trip pin is in the trip pin bore, the trip pin cannot be removed from the firing pin assembly.

9. The perimeter breach warning device of claim 1, wherein each of the plurality of storage bores form a counterbore configured to accommodate within the main body a head of the fastener comprising a head larger in diameter than a main shaft of the fastener.

10. The perimeter breach warning device of claim 1, wherein the trip pin further comprises a locking protrusion, wherein the main body forms a plurality of locking bores parallel to the firing bore comprising locking bore openings at the first main body end, wherein each of the plurality of locking bores is configured to receive the locking protrusion of the trip pin when the trip pin is inserted in the shaft, wherein one of the plurality of storage bores and one of the plurality of locking bores connect to form one continuous bore from the first main body end to the second main body end, wherein when the locking protrusion of the trip pin is in the trip pin bore, the trip pin cannot be removed from the firing pin assembly.

11. The perimeter breach warning device of claim 1, wherein the shaft of the firing pin assembly forms a plurality of trip pin bores perpendicular to its length, wherein each of the plurality of trip pin bores is configured to receive the trip pin.

12. The perimeter breach warning device of claim 1, wherein the firing pin assembly further comprises a key ring attached to the first shaft end.

13. The perimeter breach warning device of claim 1, wherein the trip pin has a first trip pin end and a second trip pin end, wherein the second trip pin end forms the shape of a circle.

14. A perimeter breach warning system comprising:

a first solid support structure;

a perimeter breach warning device attached to the first solid support structure, the perimeter breach warning device comprising:

a main body forming a firing bore therethrough, wherein the firing bore comprises a first firing bore end, a second firing bore end, and an internal firing bore protrusion, wherein the main body comprises a first main body end and a second main body end that correspond with the first firing bore end and the second firing bore end, wherein the main body forms a plurality of storage bores parallel to the firing bore comprising storage bore openings at the second main body end, wherein each of the plurality of storage bores is configured to receive a fastener, a holding protrusion at the first firing bore end, a firing pin assembly within and extending out from the firing bore, the firing pin assembly comprising:

a shaft comprising a first shaft end and a second shaft end, wherein the shaft comprises:

a firing pin at the second shaft end, and an external shaft protrusion, wherein, at the first shaft end, the shaft forms a trip pin bore perpendicular to its length, a spring about the shaft between the external shaft protrusion and the holding protrusion, a primer within the firing bore at the second firing bore end, a safety nozzle removably attached to the second firing bore end and configured to partially block the storage bore openings when attached to the main body, the safety nozzle comprising a first safety nozzle end, a second safety nozzle end, an internal safety nozzle volume, and external safety nozzle walls, wherein:

the first safety nozzle end is open and removably connected to the second firing bore end, the second safety nozzle end is closed, and the external safety nozzle walls form a plurality of apertures, and a trip pin configured to be inserted into the trip pin bore of the shaft such that the spring of the firing pin assembly is compressed, wherein the spring is configured to decompress in response to removal of the trip pin, thereby causing the firing pin assembly to move within the firing bore towards the second firing bore end until the firing pin strikes the primer causing a primer explosion and the external shaft protrusion interfaces with the internal firing bore protrusion causing the firing pin assembly to stop moving towards the second firing bore end;

a second support structure; and a flexible line connected to the second support structure and the trip pin of the perimeter breach warning device such that, the pulling of the flexible line will remove of the trip pin and cause the spring to decompress, causing the firing pin assembly to move within the firing bore towards the second firing bore end until the firing pin strikes the primer causing the primer explosion and the external shaft protrusion of the shaft interfaces with the internal firing bore protrusion of the firing bore causing the firing pin assembly to stop moving towards the second firing bore end.

15. The perimeter breach warning system of claim 14, wherein the perimeter breach warning device is attached to the first solid support structure using mechanical fasteners.

16. The perimeter breach warning system of claim 14, wherein the perimeter breach warning device is attached to the first solid support structure using magnets.

17. A method of warning of perimeter breach, the method comprising:

attaching a perimeter breach warning device to a first solid support structure, the perimeter breach warning device comprising:

a main body forming a firing bore therethrough, wherein the firing bore comprises a first firing bore end, a second firing bore end, and an internal firing bore protrusion, wherein the main body comprises a first main body end and a second main body end that correspond with the first firing bore end and the second firing bore end, wherein the main body forms a plurality of storage bores parallel to the firing bore comprising storage bore openings at the second main body end, wherein each of the plurality of storage bores is configured to receive a fastener, a holding protrusion at the first firing bore end, a firing pin assembly within and extending out from the firing bore, the firing pin assembly comprising:

a shaft comprising a first shaft end and a second shaft end, wherein the shaft comprises:

a firing pin at the second shaft end, and an external shaft protrusion, wherein, at the first shaft end, the shaft forms a trip pin bore perpendicular to its length, a spring about the shaft between the external shaft protrusion and the holding protrusion, a primer within the firing bore at the second firing bore end, a safety nozzle removably attached to the second firing bore end and configured to partially block the storage bore openings when attached to the main body, the safety nozzle comprising a first safety nozzle end, a second safety nozzle end, an internal safety nozzle volume, and external safety nozzle walls, wherein:

the first safety nozzle end is open and removably connected to the second firing bore end, the second safety nozzle end is closed, and the external safety nozzle walls form a plurality of apertures, and a trip pin configured to be inserted into the trip pin bore of the shaft such that the spring of the firing pin assembly is compressed, wherein the spring is configured to decompress in response to removal of the trip pin, thereby causing the firing pin assembly to move within the firing bore towards the second firing bore end until the firing pin strikes the primer causing a primer explosion and the external shaft protrusion interfaces with the internal firing bore protrusion causing the firing pin assembly to stop moving towards the second firing bore end;

connecting the perimeter breach warning device to a second solid support structure with a flexible line, wherein, upon a perimeter breach, the flexible line will be pulled and will remove the trip pin and cause the spring to decompress, causing the firing pin assembly to move within the firing bore towards the second firing bore end until the firing pin strikes the primer causing the primer explosion and the external shaft protrusion of the shaft interfaces with the internal firing bore protrusion of the firing bore causing the firing pin assembly to stop moving towards the second firing bore end of the firing bore.

* * * * *